(12) United States Patent
Liang

(10) Patent No.: US 11,955,807 B2
(45) Date of Patent: Apr. 9, 2024

(54) RIGID WIRELESS CHARGING MOUSE PAD

(71) Applicant: YUHONG ELECTRONIC (SHENZHEN) CO., LTD., Guangdong (CN)

(72) Inventor: Wei-Jen Liang, New Taipei (TW)

(73) Assignee: YUHONG ELECTRONIC (SHENZHEN) CO., LTD., Guangdong (CN)

( * ) Notice: Subject to any disclaimer, the term of this patent is extended or adjusted under 35 U.S.C. 154(b) by 415 days.

(21) Appl. No.: 17/364,449

(22) Filed: Jun. 30, 2021

(65) Prior Publication Data
US 2023/0006471 A1    Jan. 5, 2023

(51) Int. Cl.
| | |
|---|---|
| H02J 50/10 | (2016.01) |
| G06F 3/039 | (2013.01) |
| H01F 38/14 | (2006.01) |
| H02J 7/02 | (2016.01) |

(52) U.S. Cl.
CPC ............ *H02J 50/10* (2016.02); *G06F 3/0395* (2013.01); *H01F 38/14* (2013.01); *H02J 7/02* (2013.01)

(58) Field of Classification Search
USPC .......................................................... 320/108
See application file for complete search history.

(56) References Cited

U.S. PATENT DOCUMENTS

| | | | |
|---|---|---|---|
| 11,770,024 B2* | 9/2023 | Lu ............................ | H02J 7/02 320/108 |
| 2011/0175567 A1* | 7/2011 | Kidakarn ................ | H02J 50/90 320/108 |

* cited by examiner

*Primary Examiner* — Bryce M Aisaka
(74) *Attorney, Agent, or Firm* — Chun-Ming Shih; HDLS IPR SERVICES

(57) ABSTRACT

A rigid wireless charging mouse pad includes a rigid board layer, a double-sided adhesive plate and a coil. The underside of the rigid board layer has a single-ring groove with an inner top groove wall. The double-sided adhesive plate is adhered to the inner top groove wall. The coil has surrounding rings arranged side by side with one another to form a coil module which is stacked on the double-sided adhesive plate in the single-ring groove and adhered by the double-sided adhesive plate to achieve a wireless charging effect by the mouse pad in the condition of having only one single-ring groove on the rigid board layer, so as to achieve the effects of reducing manufacturing difficulty, lowering manufacturing cost, and improving market competitiveness.

9 Claims, 3 Drawing Sheets

RIGID WIRELESS CHARGING MOUSE PAD

BACKGROUND OF THE DISCLOSURE

Technical Field

The technical field of this disclosure relates to a mouse pad, and more particularly to a rigid wireless charging mouse pad.

Description of Related Art

With the rise of various wireless electronic products, people become accustomed to the use of electronic products wirelessly, and the related art of charging an electronic product by connecting a cable to the electronic product is gradually replaced by wireless charging in recent years. Users simply need to put an electronic product with a receiving coil on a wireless charger with a transmitting coil for wireless charging without requiring any cable connection. Charging can be performed anytime and anywhere, which is very convenient.

In the wireless charging technology, magnetic resonance is used to achieve the effect of wireless charging. A magnetic resonance type wireless charging uses resonant devices (including inductors and capacitors) to drive a transmitting end and a receiving end to reach a specific frequency, so as to generate magnetic field resonance and energy.

Although the magnetic resonance type wireless charging has the advantage of high transmission efficiency and becomes a focus of the development of the related industry, surrounding rings of a coil cannot be arranged side by side with one another when the magnetic resonance principle is used to achieve the wireless charging effect, and the substrate for accommodating the coil must requires a plurality of grooves for the surrounding rings. Moreover, the process of forming many grooves on the same substrate has certain technical issues, and it is necessary to overcome a large barrier to integrate the wireless charging function into a mouse pad because the process of forming many grooves on the same substrate is very difficult.

SUMMARY OF THE DISCLOSURE

Therefore, it is a primary objective to provide a rigid wireless charging mouse pad that adopts the principle of electromagnetic induction together with a coil module formed by arranging a plurality of surrounding rings side by side with one another to overcome the technical issue of forming many grooves on the same rigid board layer of the related-art wireless charging mouse pad, and this disclosure only requires to set or form one single-ring groove on the rigid board layer.

To achieve the aforementioned and other objectives, this disclosure discloses a rigid wireless charging mouse pad, including: a rigid board layer with an underside and having a single-ring groove concavely formed on the underside in a longitudinal direction, and an inner top groove wall being formed on a concave end point of the single-ring groove; a double-sided adhesive plate adhered to the inner top groove wall; and a coil having a plurality of surrounding rings arranged side by side with one another in a lateral direction, and each of the surrounding rings of the coil being stacked and coupled to the double-sided adhesive plate in the longitudinal direction inside the single-ring groove and adhered by the double-sided adhesive plate.

Compared with the related art, this disclosure has the following effect. Only one single-ring groove is set or formed on the rigid board layer to achieve the wireless charging of a mouse by the mouse pad. This disclosure has the advantages of reducing manufacturing difficulty, lowering manufacturing cost, and improving market competitiveness.

DESCRIPTION OF THE EMBODIMENTS

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
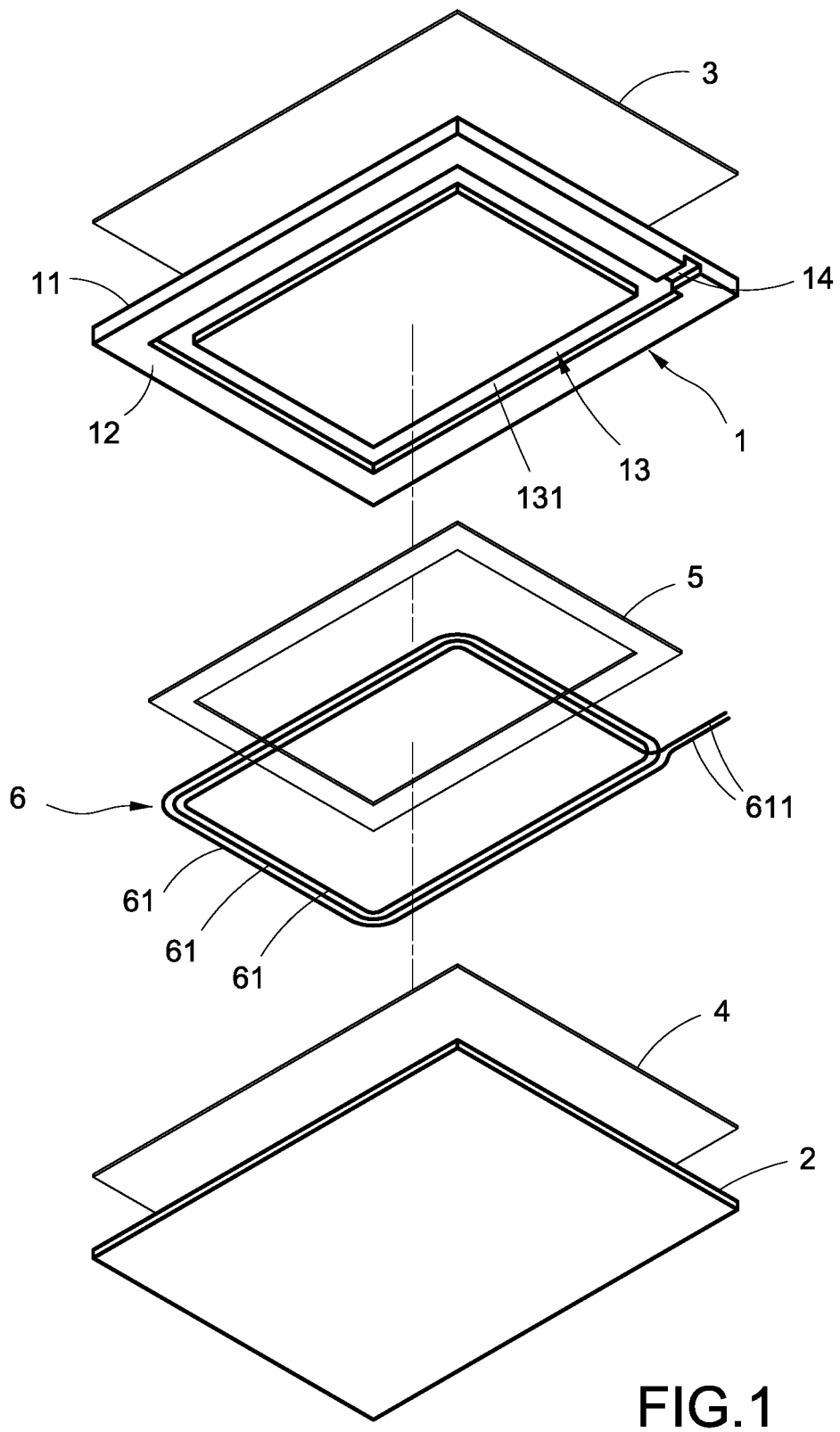
FIG. 1 is an exploded view of a mouse pad of this disclosure, viewing from the bottom.
Figure 2:
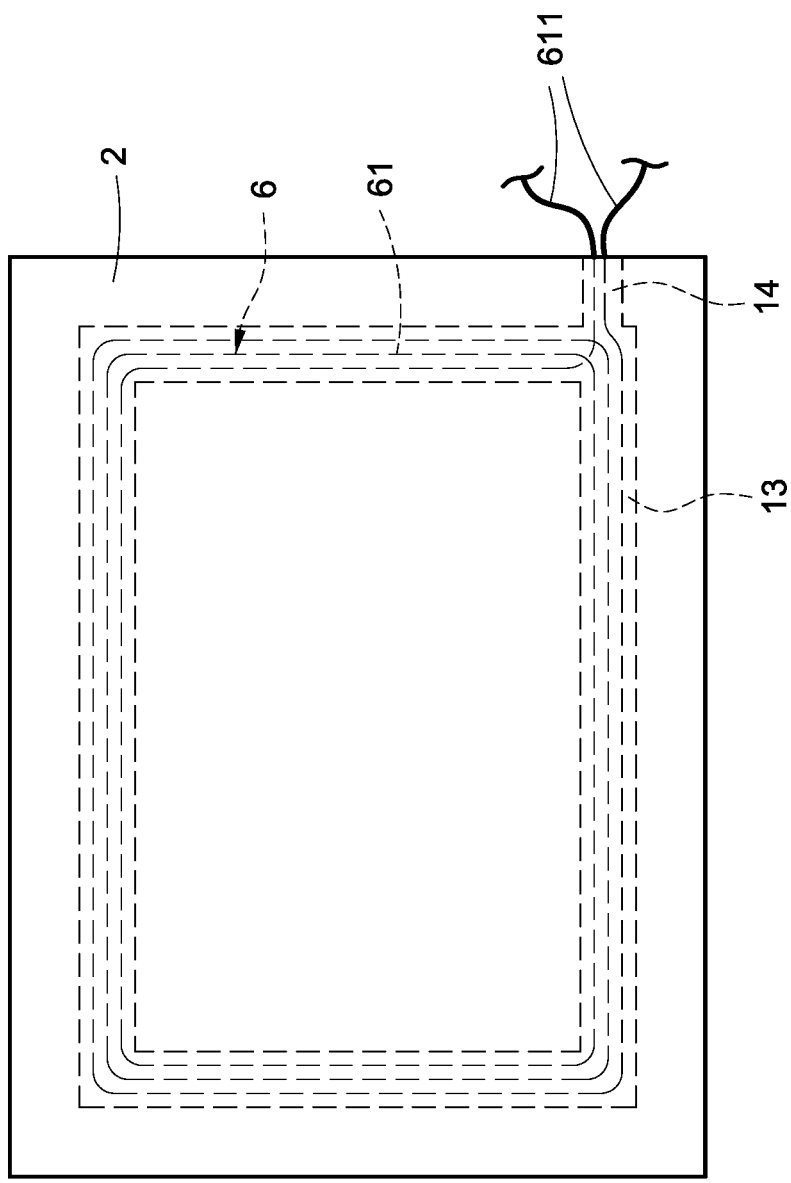
FIG. 2 is a schematic view of an assembled mouse pad of this disclosure mouse pad, viewing from the bottom.
Figure 3:
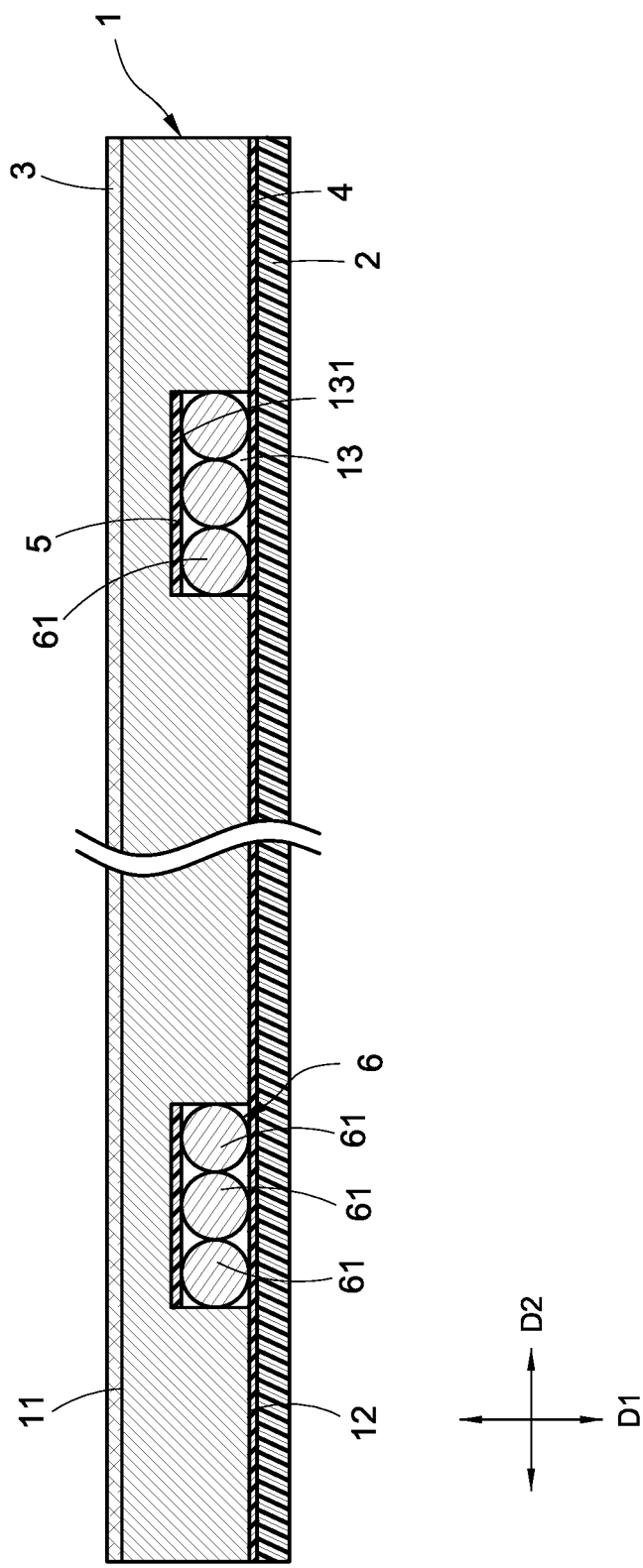
FIG. 3 is a cross-sectional view of an assembled mouse pad of this disclosure.

With reference to FIGS. 1 to 3 for a rigid wireless charging mouse pad of this disclosure (hereinafter referred to as the "mouse pad"), the mouse pad is a rigid mouse pad with a wireless charging function. The mouse pad of this disclosure includes a rigid board layer 1, a double-sided adhesive plate 5 and a coil 6. In some embodiments, the mouse pad further includes an anti-slip layer 2, a contact layer 3 and a support material layer 4 as described below.

The rigid board layer 1 may be any rigid board, as long as the rigid board is capable of setting or forming a groove as described below. In this embodiment, the rigid board layer 1 is a rigid plastic board, but this disclosure is not limited to such arrangement only. The rigid board layer 1 has a topside 11 and an underside 12 opposite to each other, and only one single-ring groove 13 is set or formed on the underside 12 of the rigid board layer 1. In some embodiments, a communicating slot 14 is set or formed, and the communicating slot 14 communicates between the single-ring groove 13 and the outside. In FIG. 3, the rigid board layer 1 has a length and a width extending along respectively a lateral direction D2 and the other lateral direction (not labeled and perpendicular to D2 and D1), and a thickness extending along a longitudinal direction D1, so that the aforementioned single-ring groove 13 is concavely formed on the underside 12 along the longitudinal direction D1, and an inner top groove wall 131 is formed on a concave end point of the single-ring groove 13.

The single-ring groove 13 may be set or formed openly, that is, the required single-ring groove 13 may be directly formed on the underside 12. In other words, the required single-ring groove 13 may be directly evacuated from the underside 13. The aforementioned method may be in a stacking form in which the rigid board layer 1 is stacked and combined to form the required single-ring groove 13. For example, two bottom plates are stacked under a large top plate, and the two bottom plates are separated from each other, so that the required single-ring groove 13 is formed between the top plate and the two bottom plates. In other words, the single-ring groove 13 is sunken into the underside 12.

The double-sided adhesive plate 5 has a side attached or adhered to the inner top groove wall 131 and the other side adhered or fixed to the coil 6. The double-sided adhesive plate 5 may be a surrounding plate in a shape corresponding to the single-ring groove 13 as shown in FIG. 1, or a combination structure (not shown in the figures) formed by a plurality of double-sided tape units adjacently arranged with a space from each other. This disclosure is not limited to the aforementioned arrangement only, and it operates well as long as one or more double-sided tape units are attached or adhered to the inner top groove wall 131 to adhere and fix the coil 6.

The coil 6 has a plurality of surrounding rings 61. In particular, the surrounding rings 61 are arranged side by side with one another to form a coil module (which is not labeled with a numeral and is formed by connecting a plurality of wires (or the surrounding rings 61)) side by side with one another in the lateral direction D2, and the coil module is installed into the single-ring groove 13 in the longitudinal direction D1 and stacked and coupled to the double-sided adhesive plate 5, so that the coil module may be adhered and fixed into the single-ring groove 13 by the other side of the double-sided adhesive plate 5.

Both the head and tail of the coil 6 are arranged to form an overhang 611 (as shown in FIG. 1), and the overhang 611 is disposed in the communicating slot 14, so that the coil 6 may be connected to an external power supply through the overhang 611.

After the mouse pad of this disclosure is electrically connected with a power, a user may put a mouse (not shown in the figures) with the wireless charging function in a corresponding position or on the topside 11 of the rigid board layer 1 to charge the mouse on the mouse pad by the principle of electromagnetic induction. Since the rigid board layer 1 only has one single-ring groove 13, therefore this disclosure may overcome the difficulty of forming a number of grooves in the same rigid board layer 1 of related art, and has the effects of reducing the manufacturing difficulty, lowering the manufacturing cost, and improving the market competitiveness.

Although the rigid board layer 1 has slight anti-slip effect, the mouse pad of this disclosure further includes an anti-slip layer 2 to improve the anti-slip effect. The anti-slip layer 2 is directly or indirectly stacked and fixed to the underside 12 of the rigid board layer 1 in the longitudinal direction D1. The anti-slip layer 2 may be stacked on the underside 12 of the rigid board layer 1 directly (not shown in the figures) or indirectly (as shown in FIGS. 1 and 3). In this embodiment, the anti-slip layer 2 is stacked on the underside 12 of the rigid board layer 1 indirectly, and the anti-slip layer 2 is made of an anti-slip material and may be a rubber anti-slip pad or a silicone anti-slip pad.

The mouse pad of this disclosure further includes a support material layer 4 stacked and coupled to the support material layer 4 in the longitudinal direction D1 and fixed between the anti-slip layer 2 and the underside 12 of the rigid board layer 1 to form the aforementioned status of the anti-slip layer 2 being indirectly stacked and coupled to the underside 12. The support material layer 4 may be a plastic sheet or a film. Therefore, the coil module of the coil 6 may be stacked and coupled between the double-sided adhesive plate 5 and the support material layer 4 inside the single-ring groove 13 as shown in FIG. 3. In other words, the double-sided adhesive plate 5, the coil module of the coil 6, the support material layer 4 and the anti-slip layer 2 are stacked on top of one another in the longitudinal direction D1.

In addition, the surrounding rings 61 used to form the aforementioned coil module are partly coplanar with the underside as shown in FIG. 3. In other words, the underside of the surrounding rings 61 are coplanar with the underside of the rigid board layer 1 in order to prevent the anti-slip layer 2 and/or the support material layer 4 from being uneven when the mouse pad is in use.

Although the rigid board layer 1 has some effects of contacting the mouse for use, the mouse pad of this disclosure further includes a contact layer 3 stacked and fixed to the topside 11 of the rigid board layer 1 in the longitudinal direction D1 to further improve the contact effect. The contact layer 3 may be a piece of cloth, a film, or a plastic sheet.

It is noteworthy that the anti-slip layer 2, the contact layer 3, and the support material layer 4 may be fixed by adhesion or engaged with each other by hot pressing, which is not limited by this disclosure.

In summation of the description above, the rigid wireless charging mouse pad of this disclosure surely achieves the expected objective of use, overcomes the drawbacks of the related art.

While this disclosure has been described by means of specific embodiments, numerous modifications and variations could be made thereto by those skilled in the art without departing from the scope and spirit of this disclosure set forth in the claims.

What is claimed is:

1. A rigid wireless charging mouse pad, comprising:
   a rigid board layer, comprising an underside and a single-ring groove disposed on the underside, wherein the single-ring groove is concave on the underside along a longitudinal direction, and an inner top groove wall is disposed on a concave end point of the single-ring groove;
   a double-sided adhesive plate, adhered to the inner top groove wall; and
   a coil, comprising a plurality of surrounding rings arranged adjacently with each other in a lateral direction, wherein each of the surrounding rings of the coil is stacked and connected with the double-sided adhesive plate along the longitudinal direction inside the single-ring groove and is adhered by the double-sided adhesive plate.

2. The rigid wireless charging mouse pad in claim 1, further comprising: an anti-slip layer, stacked and connected to the underside of the rigid board layer along the longitudinal direction.

3. The rigid wireless charging mouse pad in claim 2, wherein the anti-slip layer is a rubber anti-slip pad or a silicone anti-slip pad.

4. The rigid wireless charging mouse pad in claim 2, wherein the surrounding rings arranged adjacently with each other along the lateral direction are stacked and connected between the double-sided adhesive plate and the anti-slip layer inside the single-ring groove.

5. The rigid wireless charging mouse pad in claim 2, further comprising: a support material layer, stacked and connected between the anti-slip layer and the underside of the rigid board layer in the longitudinal direction.

6. The rigid wireless charging mouse pad in claim 5, wherein the support material layer is a plastic sheet or a film.

7. The rigid wireless charging mouse pad in claim 1, further comprising: a contact layer, and the rigid board layer comprising a topside, and the contact layer being stacked and connected to the topside along the longitudinal direction.

8. The rigid wireless charging mouse pad in claim 7, wherein the contact layer is a piece of cloth, a film, or a plastic sheet.

9. The rigid wireless charging mouse pad in claim 1, wherein all of the surrounding rings of the coil are partly coplanar with the underside.

\* \* \* \* \*